United States Patent [19]

Off et al.

[11] Patent Number: 4,481,067

[45] Date of Patent: Nov. 6, 1984

[54] APPARATUS FOR ADHESIVE STRIP APPLICATION

[75] Inventors: Joseph W. A. Off, Irving; Judson H. Early, Dallas; Daniel K. Roady, Dallas; Theodore B. Thayer, Dallas, all of Tex.

[73] Assignee: Haggar Company, Dallas, Tex.

[21] Appl. No.: 408,640

[22] Filed: Aug. 16, 1982

Related U.S. Application Data

[63] Continuation-in-part of Ser. No. 170,750, Jul. 21, 1980, Pat. No. 4,371,074.

[51] Int. Cl.³ .............................................. B32B 31/00
[52] U.S. Cl. .................................... 156/541; 156/247; 156/248; 156/514; 156/517; 156/521; 156/542; 156/584
[58] Field of Search ............................... 156/540–542, 156/518–522, 358–359, 361, 344, 238, 247–249

[56] References Cited

U.S. PATENT DOCUMENTS

| | | | |
|---|---|---|---|
| 3,654,016 | 4/1972 | Alexander | 156/540 X |
| 3,765,992 | 10/1973 | Stageberg | 156/521 |
| 3,783,059 | 1/1974 | Black et al. | 156/519 X |
| 3,944,455 | 3/1976 | French | 156/542 X |
| 3,997,384 | 12/1976 | Kuring et al. | 156/542 X |
| 4,214,937 | 7/1980 | Geurtsen | 156/361 |
| 4,226,661 | 10/1980 | Off et al. | 156/358 |

Primary Examiner—David Simmons
Attorney, Agent, or Firm—Richards, Harris & Medlock

[57] ABSTRACT

An apparatus (100) for applying a strip of adhesive (22) to a workpiece (10) is provided. The apparatus (100) includes an applicator (150) reciprocally mounted to a support member (108) such that a working position and a standby position are established. If desired, a pair of applicators (150, 152) can be provided to apply parallel strips of adhesive (22) and one of the applicators (150) may be pivoted relative the support member (108) to allow access to the interior of the applicators (150, 152) for maintenance or inspection. The applicators (150, 152) include a feed pulley assembly (190) located between a roll (184) of adhesive ribbon (182) and a cutter assembly (220) for cutting the adhesive into discrete strips (322). The feed pulley assembly (190) maintains a slack condition in the adhesive ribbon (182), thereby preventing undue tension from being applied to the adhesive ribbon (182) during advancement. The apparatus (100) also includes a stripper-feeder assembly (280) which includes a carriage (282). The carriage (282) is reciprocally mounted to the applicator (150), and removes the backing from an applied strip of adhesive (322) when translated in one direction, and advances the adhesive ribbon (182) when translated in the other direction.

15 Claims, 9 Drawing Figures

APPARATUS FOR ADHESIVE STRIP APPLICATION

CROSS REFERENCE TO RELATED APPLICATIONS

This application is a continuation-in-part of co-pending U.S. patent application Ser. No. 170,750 filed July 21, 1980, now U.S. Pat. No. 4,371,074 issued Feb. 1, 1983.

TECHNICAL FIELD

This invention relates to an apparatus for applying adhesive to a workpiece, and more particularly to a self-contained apparatus for applying discrete strips of adhesive having a backing to a workpiece and removing the backing after application.

BACKGROUND ART

The present invention is directed to an improvement in an apparatus for applying discrete adhesive strips to a workpiece. U.S. Pat. No. 4,214,933, issued July 29, 1980 to the assignee hereof, discloses dividing a continuous ribbon of adhesive having a backing into discrete strips of adhesive joined only by the backing. The length of the ribbon is sensed by means of a roller or rollers contacting the ribbon. The adhesive strips are positioned adjacent a piece of material and activated to cause adherence of the adhesive to the material. The backing is then removed, leaving the unbacked adhesive strip adhered to the material.

Although the prior art apparatus and methods have been quite satisfactory, further development has led to improvements in the removal of the backing from the applied strip of adhesive. Another improvement provides for reduced tension placed on the adhesive ribbon in the input path. Still another area of improvement involves providing access to internal elements of the apparatus for servicing, particularly where dual applicators on one apparatus apply parallel discrete strips of adhesive.

SUMMARY OF THE INVENTION

The present invention provides an apparatus for depositing strips of adhesive with a backing to a workpiece. A movable pulley is located along the input path of the adhesive ribbon before the measuring, cutting and applying apparatus to selectively lengthen the input path. A clamp disposed along the input path between the cutting and applying apparatus grips the adhesive ribbon simultaneously with the activation of the movable pulley, thereby preventing tension from being applied to the adhesive ribbon beyond the clamp. The activation of the movable pulley and clamp are timed to provide a length of slack ribbon during the applying of the adhesive and the advancing or the adhesive ribbon.

In another aspect of the invention, an apparatus for removing the backing from a previously applied strip of adhesive is provided. A clamp and pair of idler rollers separated by a vertical gap are disposed on a carriage in position to clear a heating element. Another clamp is located in a fixed position relative the carriage. The entire apparatus is provided with a pneumatic driver to vertically separate the apparatus a small distance from the work surface. After application of the adhesive, the entire apparatus is separated by a small distance from the work surface by the pneumatic driver. The fixed clamp is activated to prevent movement of the backing relative the work surface, and the carriage and idler rollers are moved over the adhesive strip to lift and separate the backing from the applied strip of adhesive. The fixed clamp is then released and the clamp on the carriage is activated. The carriage then returns to its original position, and the ribbon of adhesive is advanced to position a new strip of adhesive in place for application.

In another aspect of the invention, a self-contained adhesive application apparatus is pivotally mounted on a carriage supported by guiding structure. During operation, the pneumatic driver biases the apparatus toward the work surface against a spring. When maintenance or inspection of the apparatus is necessary, pneumatic pressure is removed from the driver and the apparatus is separated from the work surface a known distance by force or the spring. The pivotal mounting of the apparatus facilitates access to all sides of the apparatus.

BRIEF DESCRIPTION OF THE DRAWINGS

A more complete understanding of the invention and its advantages will be apparent from the Detailed Description taken in conjunction with the accompanying Drawings in which.

DETAILED DESCRIPTION

Figure 1:
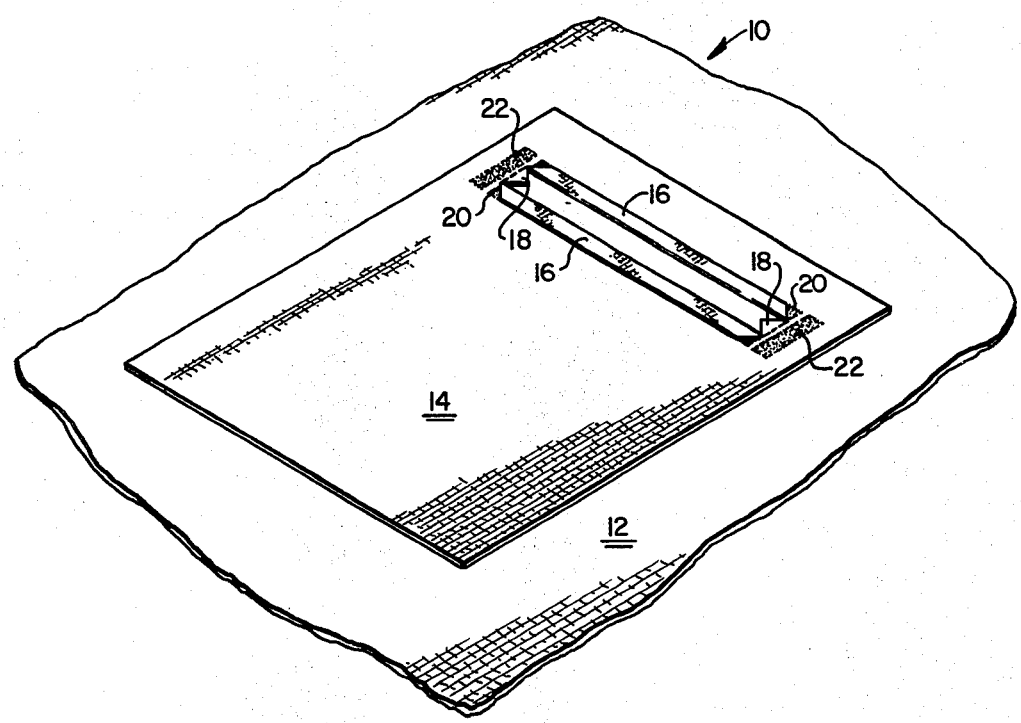
FIG. 1 illustrates an exemplary workpiece for use with the present invention.

Referring initially to FIG. 1, an exemplary workpiece prepared by the apparatus of the present invention is illustrated in order to clearly describe the environment of the invention. Workpiece 10 consists primarily of a fabric panel 12. Panel 12, in this example, is a section of a garment in which it is desired to form a pocket by the attachment of pocket blank 14 to panel 12. The pocket construction shown in FIG. 1 is similar to that disclosed in U.S. Pat. No. 4,156,293, issued May 29, 1978 and assigned to the assignee of the present invention. An opening has been made in fabric 12 to form flap sets 16 and 18. In the example depicted in FIG. 1, flap set 16 has been adhesively connected to blank 14 by an adhesive layer 20 applied by the apparatus of the present invention. Adhesive layers 22 are shown applied, with flap set 18 in position to be folded over and adhesively connected to blank 14. In the pocket construction illustrated by FIG. 1, it is desirable to accurately apply discrete strips of adhesive to a material. It is convenient to apply adhesive strips in sets of parallel strips, such as adhesive set 20 and adhesive set 22.

Figure 2:
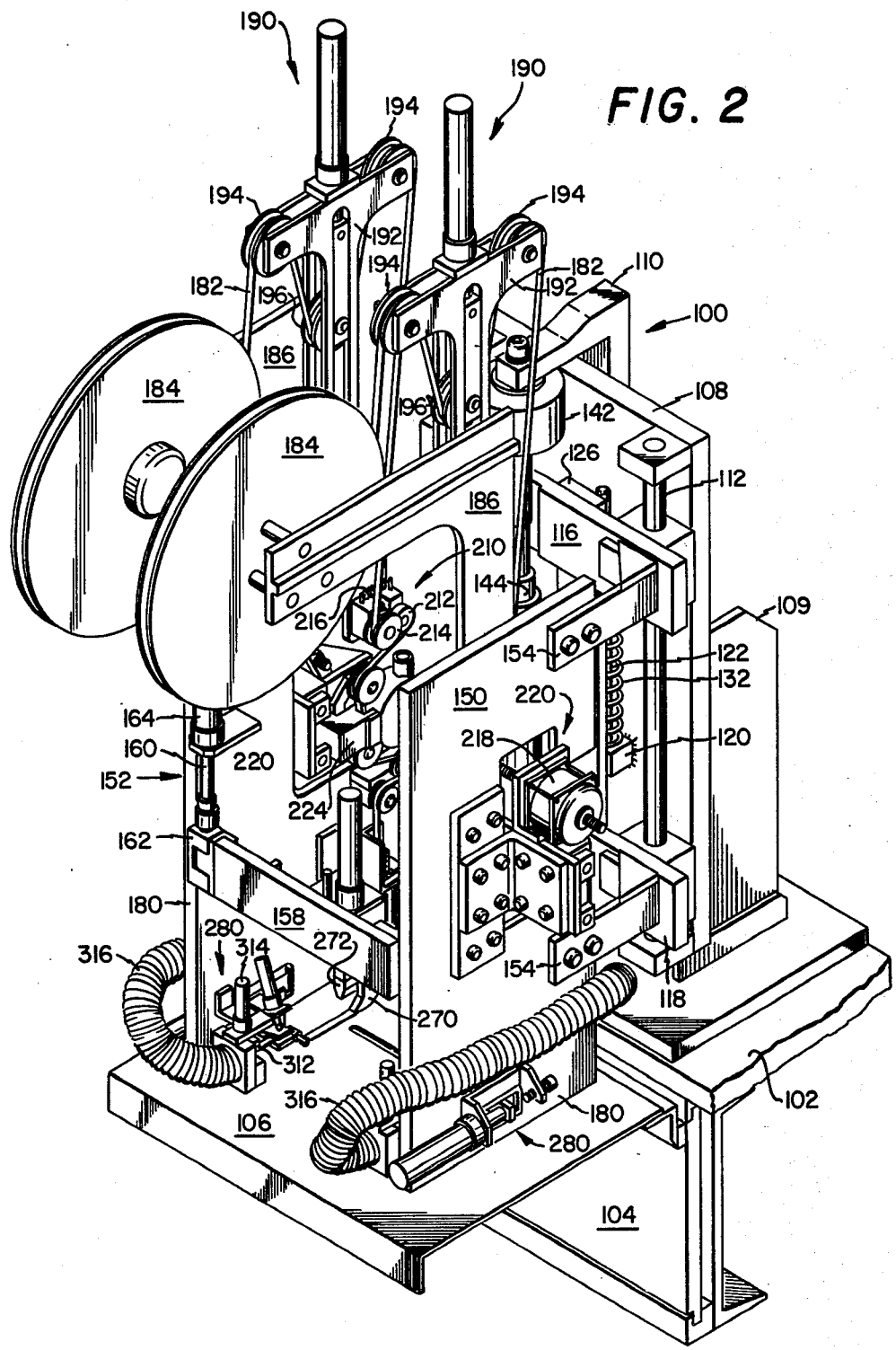
FIG. 2 is a perspective view of apparatus constructed in accordance with the present invention.
Figure 3:
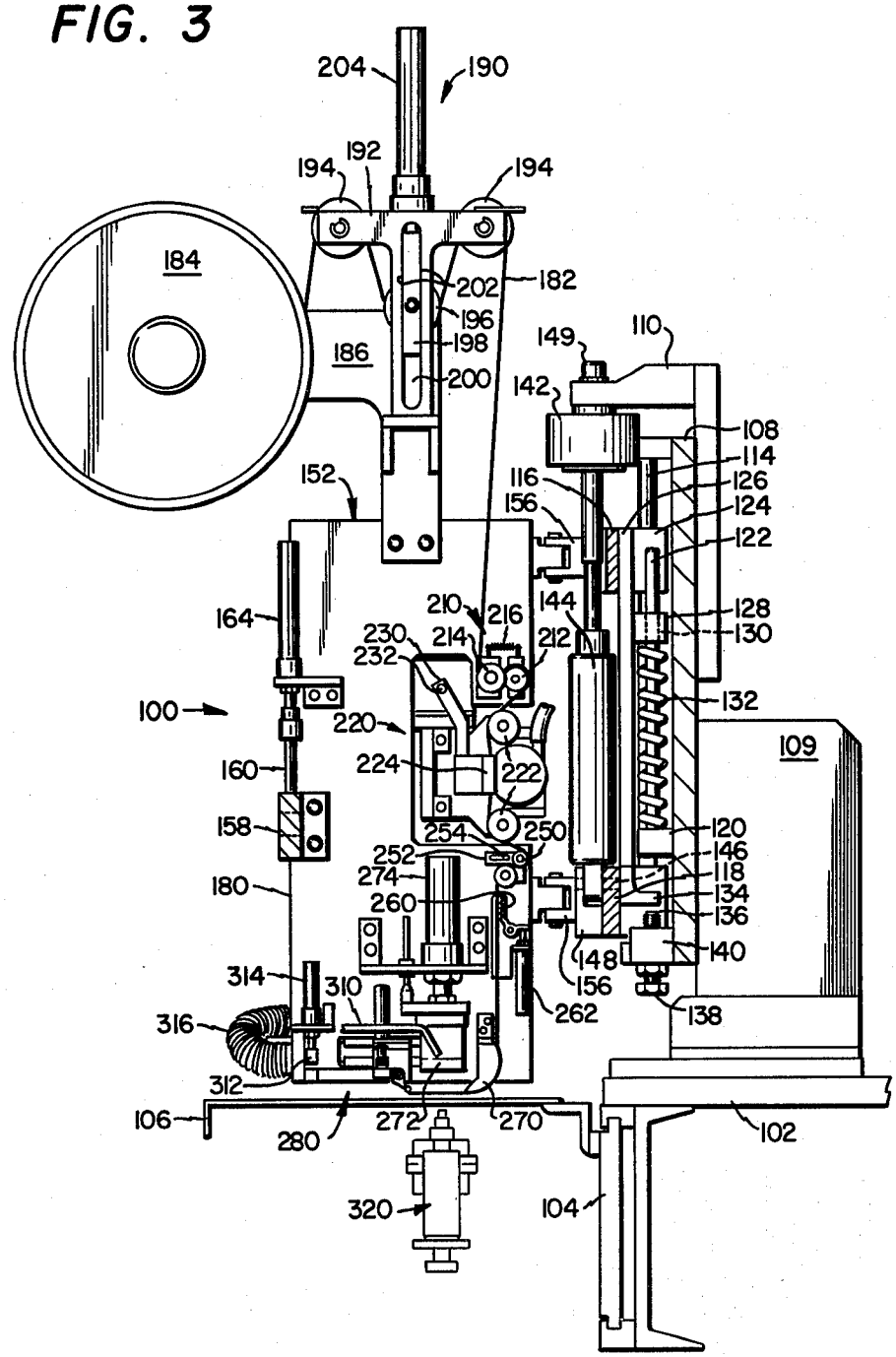
FIG. 3 is a partially broken away side view of the apparatus of FIG. 2.

Referring now to FIGS. 2 and 3, apparatus 100 is preferably one station in a multi-station system for automatically implanting pockets to garment panels, such as that disclosed in application Ser. No. 170,750, now U.S. Pat. No. 4,371,074, issued Feb. 1, 1983 and assigned to the assignee of the present invention which disclosure is herein incorporated by reference. It will be understood, however, that apparatus 100 may be used for any application where it is desired to apply a strip or strips of adhesive to a material. Apparatus 100 is attached to table 102 having an endless belt 104 mounted for movement around the periphery of table 102. A plurality of carriers 106 are secured to belt 104. Each carrier 106 is provided with a template clamp assembly (not shown) adapted to releasably receive a workpiece 10. Belt 104 is indexed and controlled to transport carriers 106 and attached workpieces 10 between work stations situated around table 102. The table 102 of the present application corresponds to the table top 20 disclosed in U.S. patent application Ser. No. 170,750 filed July 21, 1980. The belt 104 and carrier 106 correspond to belt 24 and carrier 14, respectively, in U.S. patent application Ser. No. 170,750.

Mounted on table 102 is upright support member 108 rigidly mounted to base 109. Arm 110 extends outwardly from the top portion of support member 108. Bars 112 and 114 are rigidly mounted to support member 108 in a vertical position.

Bars 112 and 114 slidably support upper and lower horizontal frame members 116 and 118. Support member 108 includes stop 120 which is rigidly connected to bar 122. Vertical frame member 126 connects horizontal frame members 116 and 118, and includes stop 128. Bar 122 is loosely retained by cylindrical walls 130 (shown in phantom lines) in stop 128. Spring 132 is contained by stops 120 and 128 and bar 122.

Lower horizontal frame member 118 includes stop 134 disposed adjacent nylon plug 136. Nylon plug 136 is attached to the end of bolt 138, which threadably engages stop 140 attached to support member 108.

Spanning between arm 110 and lower horizontal frame member 118 are upper pneumatic driver 142 and lower pneumatic driver 144. Lower pneumatic driver 144 is rigidly connected to lower horizontal frame member 118 by bolt 146 through member 148. Upper pneumatic driver 142 is connected to arm 110 by bolt 149. Upper pneumatic driver 142 has a stroke of approximately 0.25 inches, and lower pneumatic driver has a stroke of approximately 2 inches.

It will be understood that horizontal frame members 116 and 118 in combination with vertical frame member 126 form a frame which slidably engages vertical bars 112, 114 and 122. The vertical position of the frame relative support member 108 is controlled by drivers 142 and 144 and the bias of spring 132.

Apparatus 100 includes right applicator 150 and left applicator 152 carried by the frame of members 116, 118 and 126. Right applicator 150 is connected to the horizontal frame members by rigid angle members 154, and left applicator 152 is connected to the horizontal frame members by hinges 156. As is more clearly shown in FIG. 4, left applicator 152 is pivotable about an arc of approximatley 90° through hinges 156, while right applicator 150 is rigidly maintained in position by angle members 154. Bar 158 is rigidly attached to right applicator 150 at one end and has cylindrical wall 159 defining an aperture on the other end. Left applicator 152 includes plunger 160 slidably carried by guide 162 and actuated by pneumatic driver 164. When left applicator 152 is in the fully closed position, as illustrated by FIG. 2, cylindrical wall 159 aligns with guide 162 such that plunger 160 may pass therethrough to lock left applicator 152 in the closed position.

Right and left applicators 150 and 152 are essentially identical, being mirror images of one another. Each applicator includes a plate 180 secured by angle members 154, in the case of right applicator 150, or by hinges 156, in the case of left applicator 152. Disposed on plate 180 is an apparatus which defines an input path for adhesive ribbon 182. The input path of ribbon 182 begins at reel 184, where ribbon 182 is stored in roll form. Reel 184 is detachably mounted to arm 186, which is an angle-shaped member attached at the other end to plate 180. Feed pulley assembly 190 is located at approximately the vertex of arm 186. Feed pulley assembly 190 includes a t-shaped frame 192, in which idler pulleys 194 and feed pulley 196 are mounted. Feed pulley 196 is mounted on slider 198, which engages channel 200 defined by parallel walls 202 of frame 192. Pneumatic driver 204, having a stroke of approximately one inch, is connected to slider 198. The input path of ribbon 182 is disposed such that ribbon 182 encounters feed pulley 196 between idler pulleys 194.

Disposed next along the input path of ribbon 182 is metering assembly 210. Metering assembly 210 includes pulleys 212 and 214 which frictionally engage ribbon 182 under the influence of spring 216. Metering assembly 210 includes a transducer (not shown) for measuring the amount of ribbon 182 that passes through pulleys 212 and 214. The transducer includes a pickup to sense rotation of pulley 214. Pulleys 214 and 212 rotate in opposite direction at the same rotational velocity.

Figure 5:
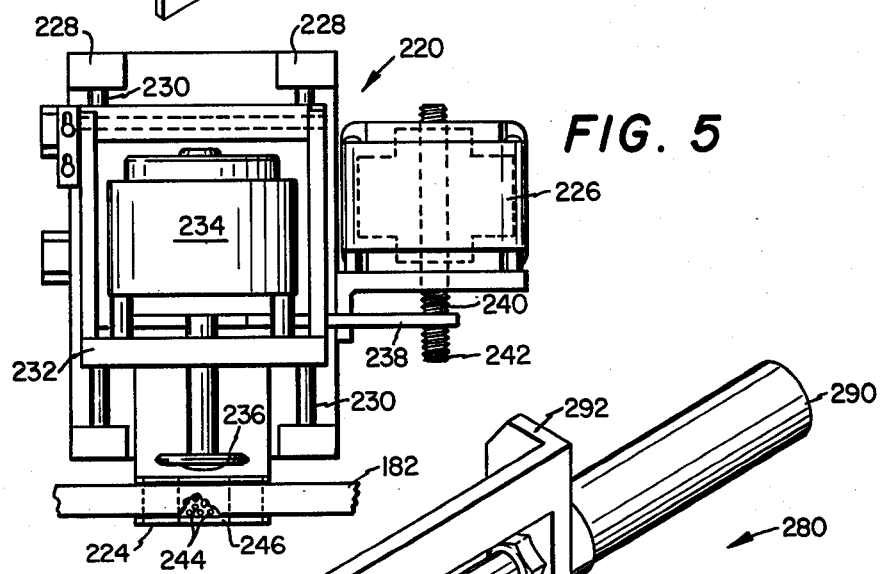
FIG. 5 is a detail view of a cutter used in the apparatus of FIG. 2.

Referring now to FIG. 5 in conjunction with FIGS. 2 and 3, cutter assembly 220 includes idler rollers 222 and anvil 224 along the input path of ribbon 182. Linear actuator 226 and frame 228 are rigidly attached to plate 180. Frame 228 includes rods 230 secured thereto. Slidably connected to rods 230 is carriage 232, which carries motor 234 and cutter 236. Arm 238 is attached to carriage 232 and includes threaded hole 240 engaging threaded shaft 242 of linear actuator 226. Anvil 224 includes perforations 244 in convex surface 246 along the input path of ribbon 182.

The construction and operation of the metering assembly and cutter assembly just described are discussed in more detail in U.S. Pat. No. 4,226,661, issued Oct. 7, 1980 to the assignee of the present invention which disclosure is herein incorporated by reference.

Referring back now to FIGS. 2 and 3 only, the input path of ribbon 182 includes adjusting pulley 250 mounted on slider 252. The position of adjusting pulley 250 relative plate 180 may be adjusted by means of bolt 254.

The input path of ribbon 182 further includes clamp 260 actuated by pneumatic driver 262. Clamp 260 is pivotally mounted relative to plate 180, and pivots to grip ribbon 182 when pneumatic driver 262 is actuated.

Guide 270 causes ribbon 182 to become parallel to carrier 106 adjacent heater element 272. Heater element 272 is attached to pneumatic driver 274.

Figure 6:
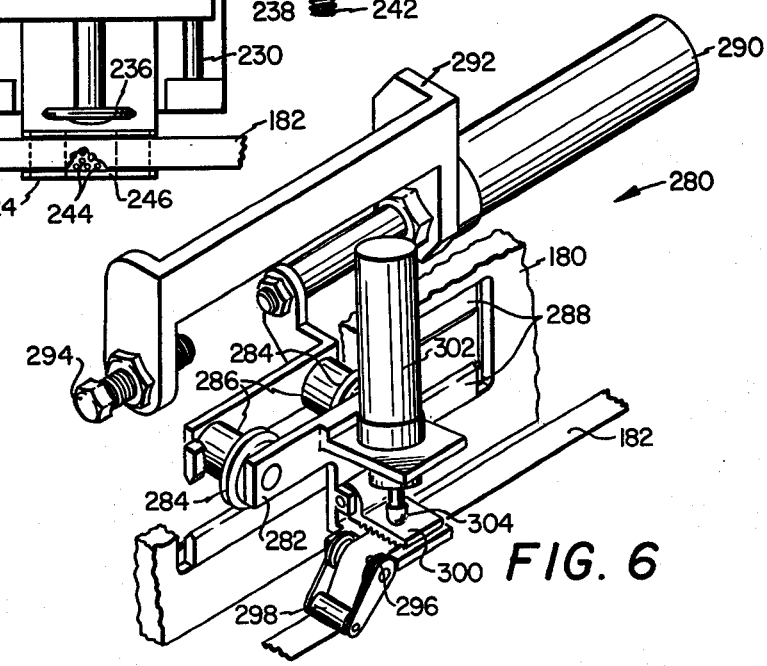
FIG. 6 is a detail view of a stripper-feeder constructed in accordance with the present invention.

Referring now to FIG. 6 in conjunction with FIGS. 2 and 3, the input path of ribbon 182 includes stripper-feeder assembly 280. Carriage 282 is reciprocally mounted in plate 180. V-grooved rollers 284, carried on bearing sleeves 286, support carriage 282 on hardened and pointed ways 288 mounted in plate 180. Carriage 282 is reciprocated relative plate 180 by pneumatic driver 290 secured relative plate 180 by frame 292. The travel of carriage 282 is limited by adjusting screw 294. Carriage 282 includes rollers 296 and 298 along the input path of ribbon 182. Rollers 296 and 298 are separated by a small vertical distance. Clamp 300, actuated by pneumatic driver 302 through nylon tip 304, is pivotally attached to carriage 282.

Referring back now to FIGS. 2 and 3 only, pipe 310 is connected to a source of compressed air (not shown) and is disposed to direct cold air onto the portion of ribbon 182 directly below heater 272. Clamp 312, actuated by pneumatic driver 314 attached to plate 180, is disposed to grip ribbon 182 adjacent the entrance of vacuum hose 316. Vacuum line 316 is attached to a source of vacuum (not shown). Folding apparatus 320 is disposed under carrier 106, and is described in more detail in application Ser. No. 175,576, now U.S. Pat. No. 4,337,881, issued July 6, 1982 and assigned to the assignee of the present invention which disclosure is hereby incorporated by reference.

Figure 4:
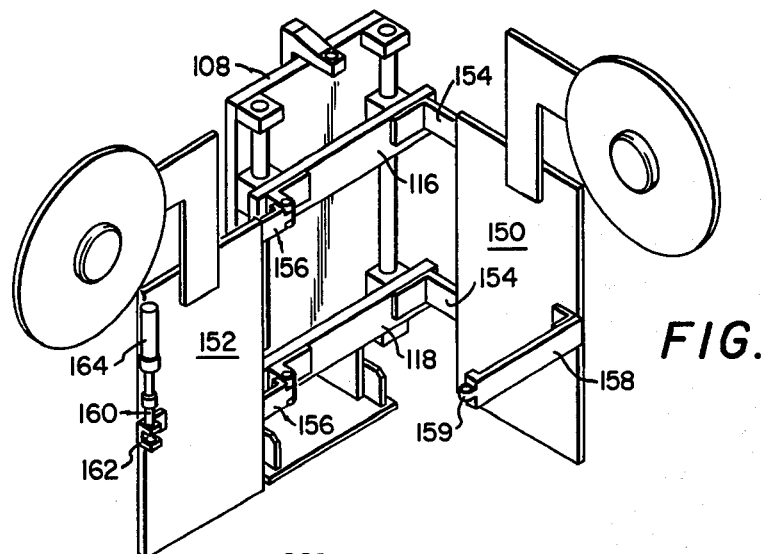
FIG. 4 is a perspective view of the apparatus of FIG. 2 showing one applicator pivoted for maintenance or inspection.

In operation, apparatus 100 applies adhesive strip sets 22 to workpieces 10 attached to carriers 106. The lower pneumatic driver 144 is activated against the bias of spring 132 to place applicators 150 and 152 in a working position. Stop 134 and nylon plug 136 serve to locate the applicators at the proper height relative carriers 106. During inspection or maintenance, driver 144 is deactivated such that the applicators are raised to a standby position by spring 132. Pivotally-attached applicator 152 may then be swung to the side, as shown in FIG. 4, to allow access to the interior portions of apparatus 100. The spring-loaded feature of the invention also increases the safety of apparatus 100, by causing the applicators to raise from carrier 106 in the event of a pneumatic or electric system failure.

Figure 7:
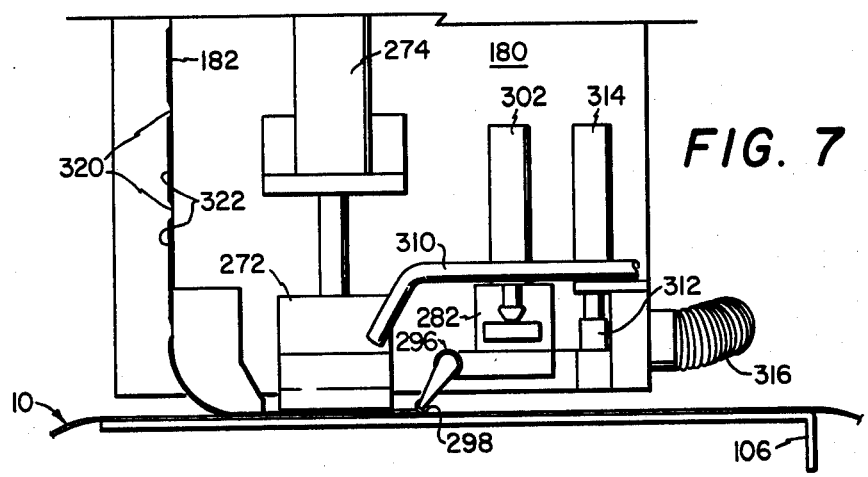
FIGS. 7, 8 and 9 illustrate successive steps in operation of the stripper-feeder of FIG. 6.
Figure 8:
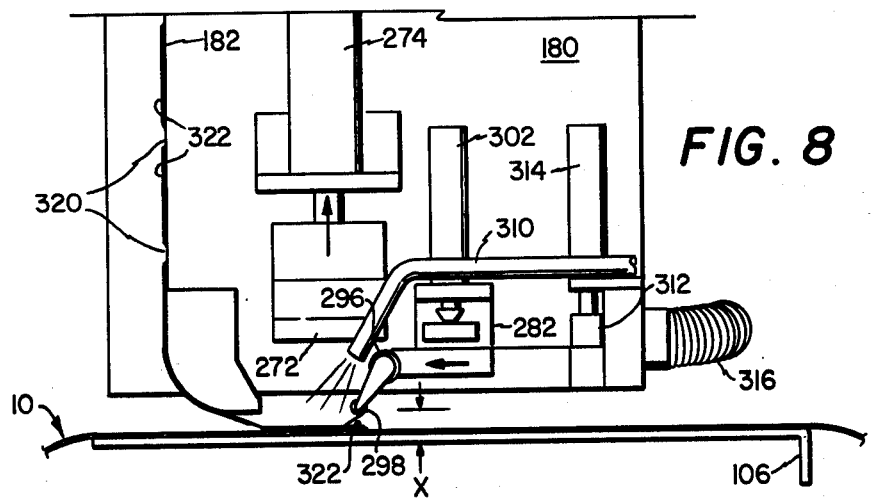
Figure 9:
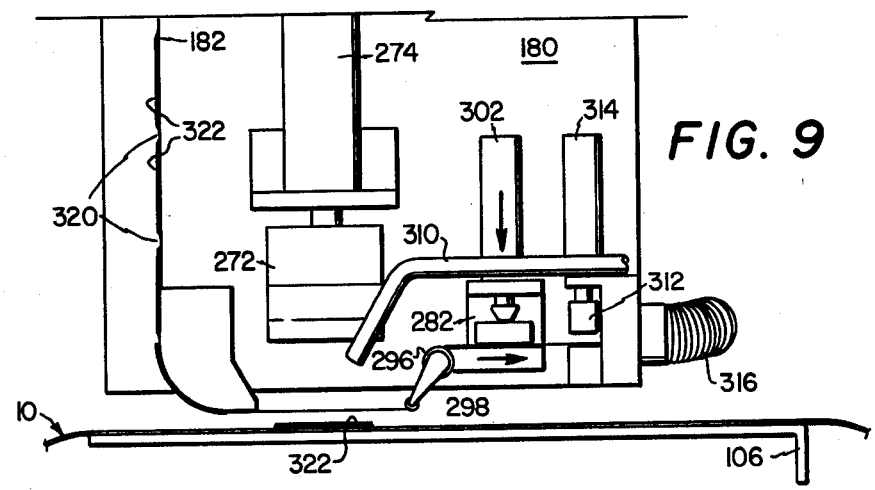

As shown in FIGS. 7, 8 and 9, where the thickness of adhesive has been greatly exaggerated, cutter assembly 220 cuts divisions 320 into the adhesive of ribbon 182 to form a plurality of discrete adhesive strips 322. The length of strips 322 can be varied by adjusting screw 294. Screw 294 determines the range of motion of carriage 282, which in turn sets the length ribbon 182 that is advanced for each actuation of pneumatic driver 290. The length of the input path of ribbon 182 between cutter 236 and heater 272 is adjusted by means of adjusting pulley 250 to be a multiple of the distance between divisions 320. Cutter 236 is brought to bear on ribbon 182 by the action of linear actuator 226 causing frame 228 to reciprocate.

As shown in FIG. 7, heater 272 is brought to bear against an adhesive strip 322 with the backing side up by the actuation of driver 274. Heater 272 is applied against the backing of ribbon 182 and melts adhesive strip 322 against workpiece 10. Heater 272 is then withdrawn, as shown in FIG. 8, and pipe 310 causes cold air to blow against and cool the section of molten ribbon 182 under the heater. The short blast of cold air from pipe 310 prevents the adhesive from stringing when the backing is removed. Next, driver 314 is activated to close clamp 312 against ribbon 182. Plate 180 is then raised by upper driver 142 to cause a separation "x" between roller 298 and carrier 106. Separation x is shown greatly exaggerated in FIGS. 8 and 9 for clarity, and in the preferred embodiment, is approximately one-tenth of an inch. The activation of driver 290 then causes carriage 282 to move backwards along the input path of ribbon 182, i.e., in a direction generally towards reel 184 and away from vacuum line 316, thereby causing the backing of ribbon 182 to become separated from the now-attached adhesive strip 322. At the end of the backwards stroke of driver 290, the backing has been completely removed from the now-attached adhesive strip 322, and driver 302 is activated, and driver 314 is released, as shown in FIG. 9. Upon retraction of driver 290, ribbon 182 is advanced forwards along the input path to present a new adhesive strip 322 below heater 272. The backing of ribbon 182 is withdrawn into vacuum line 316. Clamp 312, adjacent the opening of vacuum line 316, is normally closed, thereby reducing the noise of the apparatus and the need for vacuum.

It is desirable to have ribbon 182 relatively slack between metering assembly 210 and reel 184 to reduce the tension on ribbon 182 during operation of stripper-feeder assembly 280. The slack condition is maintained by the operation of feed pulley assembly 190 in conjunction with clamp 260. Between operations of stripper-feeder 280, clamp 260 is closed and feed pulley assembly 190 is sequenced by the activation of driver 204 to cause an amount of ribbon 182 to be pulled from reel 184. Clamp 260 prevents ribbon 182 from being pulled back through the applicator during the activation of driver 204.

While certain embodiments of the present invention have been described in detail herein as shown in the accompanying Drawings, it will be evident that various further modifications are possible without departing from the scope of the invention.

We claim:

1. An apparatus for applying an adhesive strip to a workpiece comprising:
   a support member;
   a frame slidably engaging a plurality of vertical bars rigidly attached to said support member;
   an applicator carried by said frame;
   means for reciprocating said applicator and said frame between a working and a standby position;
   a quantity of adhesive ribbon having a backing layer and an adhesive layer;
   said quantity of ribbon being disposed upon said applicator along an input path defined by a source of said adhesive ribbon, a metering assembly for measuring an amount of said adhesive ribbon passing through said applicator, means for maintaining a slack condition between said source and said ribbon and said metering assembly, a cutter assembly performing divisions in said adhesive layer of said adhesive ribbon, means for applying said adhesive ribbon to a workpiece, and a stripper-feeder including a carriage for reciprocation along the length of the applied strip for removing said backing layer from an applied strip of adhesive when the carriage is moved in a first direction and for advancing said adhesive ribbon relative to said applicator when the carriage is moved in the opposite direction.

2. An apparatus for applying an adhesive strip to a workpiece comprising:
   a source of adhesive backed ribbon;
   means for forming said ribbon into a plurality of discrete adhesive strips;
   means for periodically advancing said ribbon;
   means for maintaining a slack condition between said source of ribbon and said means for forming a plurality of discrete adhesive strips between operations of said means for advancing said ribbon; and
   said means for maintaining a slack condition including a feed pulley assembly and a clamp, each disposed along the input path of said ribbon and intermediate of said source of ribbon and said means for advancing said ribbon, said feed pulley assembly including means for pulling a quantity of said ribbon from said source of ribbon while said clamp immobilizes said ribbon, said feed pulley assembly exerting no tension on the ribbon when the clamp releases the ribbon.

3. The apparatus of claim 2 wherein said feed pulley assembly includes a slidably mounted feed pulley disposed for movement relative to said source of ribbon.

4. An apparatus for applying an adhesive strip to a workpiece comprising:
   a source of adhesive ribbon having an adhesive layer and a backing layer;
   a quantity of said ribbon disposed in said apparatus along an input path, said input path including means for applying discrete strips of said adhesive layer to the workpiece; and
   means for removing said backing layer from individual applied strips fo adhesive which includes a reciprocally mounter roller for movement parallel to the workpiece proximate the applied discrete strips and interposed between said backing layer and said strips of adhesive for separating said backing layer from said attached strips of adhesive.

5. An apparatus for applying an adhesive strip to a workpiece comprising:
   a source of adhesive ribbon having an adhesive layer and a backing layer;
   a quantity of said ribbon disposed in said apparatus along an input path, said input path including means for applying discrete strips of said adhesive layer to the workpiece;
   means for removing said backing layer from individual applied strips fo adhesive which includes a reciprocally mounted roller for separating said backing layer from said attached strips of adhesive; and
   said reciprocally mounted roller being mounted on a carriage, and further comprising means for holding said backing layer stationary relative said carriage while said carriage reciprocates relative to said apparatus to cause said roller to remove said backing layer.

6. The apparatus of claim 5 wherein said means for holding said backing layer stationary comprises a by clamp mounted to said apparatus.

7. The apparatus of claim 5 wherein said carriage further includes means for advancing said ribbon forward along said input path.

8. The apparatus of claim 7 wherein said means for advancing comprises a clamp mounted upon said carriage for engaging said backing layer during movement of said carriage forward along said input path of said ribbon.

9. The apparatus of claims 5, 6, 7 or 8 further including means for causing a small separation between said roller and workpiece immediately before removing said backing layer from said attached strip of adhesive.

10. The apparatus of claim 9 wherein said means for causing a small separation comprises a frame connected to an applicator and slidably mounted to a base member, and means for causing translation between said frame and said base member.

11. An apparatus for applying at least two adhesive strips to a workpiece comprising:
   first and second applicators each being disposed to apply one of the adhesive strips to the workpiece;
   said first and second applicators being attached to a support member, said support member including a frame mounted for vertical reciprocation relative to said support member and attached to said first and second applicators, said frame being reciprocable between a working position and a standby position; and
   means for moving said first applicator relative to said support member and second applicator to enable access to the interior portion of the first and second applicators for repair and maintainance.

12. An apparatus for applying at least two adhesive strips to a work piece comprising:
   first and second applicators each being disposed to apply one of the adhesive strips to the work piece;
   said first and second applicators being attached to a support member;
   means for moving said first applicator relative to said support member and second applicator to enable access to interior portions of said first and second applicators; and
   said first applicator being pivotally mounted relative to said support member, and said second applicator being rigidly mounted to said support member.

13. The apparatus of claim 12 wherein said support member includes a frame mounted for vertical reciprocation relative to said support member and attached to said first and second applicators, said frame being reciprocable between a working position and a standby position.

14. The apparatus of claim 13 wherein said frame is placed in said working position against the bias of a spring contained between said frame and said support member by means for applying force disposed between said frame and said support member.

15. The apparatus of claim 12 further including means for locking said first applicator in a closed position.

* * * * *

UNITED STATES PATENT AND TRADEMARK OFFICE
CERTIFICATE OF CORRECTION

PATENT NO. : 4,481,067

DATED : November 6, 1984

INVENTOR(S) : Joseph W. A. Off, Judson H. Early, Daniel K. Roady and Theodore B. Thayer It is certified that error appears in the above-identified patent and that said Letters Patent is hereby corrected as shown below:

Column 1, line 56, change "or" to --of--.

Column 2, line 17, change "or" to --of--.

Claim 4, line 17, change "fo" to --of--.

Claim 5, line 32, change "fo" to --of--.

Claim 5, line 38, after "relative" insert --to--.

Signed and Sealed this

Twenty-seventh Day of August 1985

[SEAL]

Attest:

DONALD J. QUIGG

Attesting Officer     Acting Commissioner of Patents and Trademarks